March 5, 1968 D. B. AULD ETAL 3,372,281
HANDLE-PROBE CONSTRUCTION FOR PORTABLE AND SUBSURFACE
DENSITY GAUGE USING RADIOACTIVE SOURCE
Filed Dec. 31, 1964 3 Sheets-Sheet 3

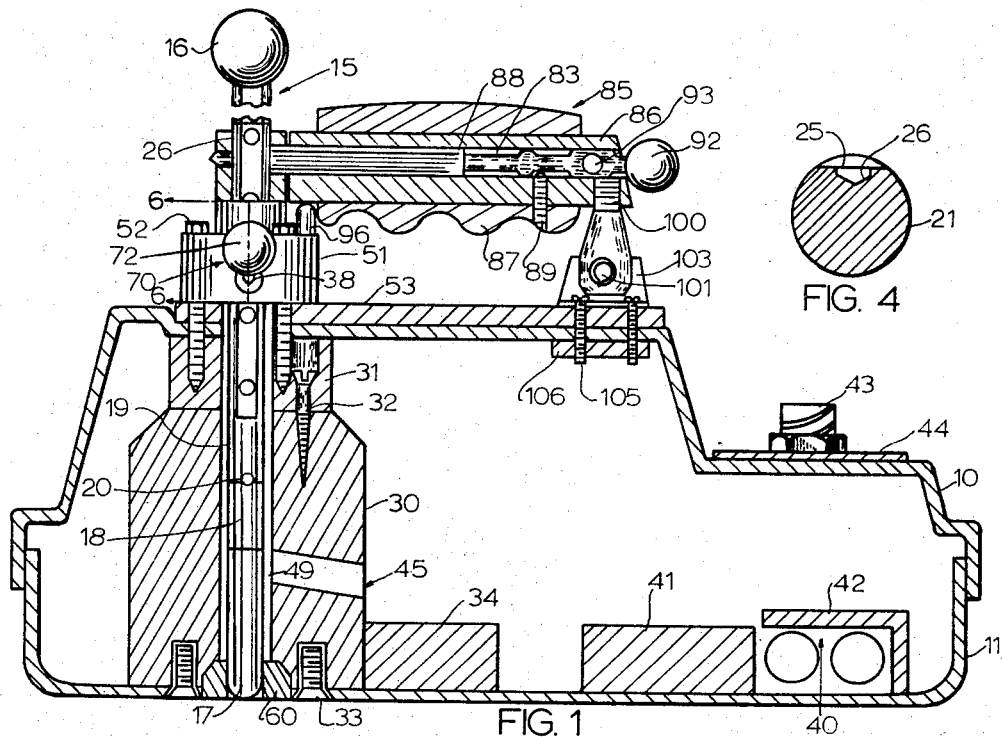
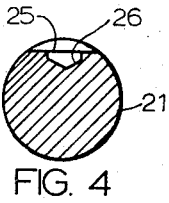
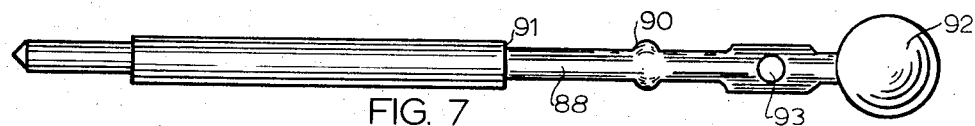
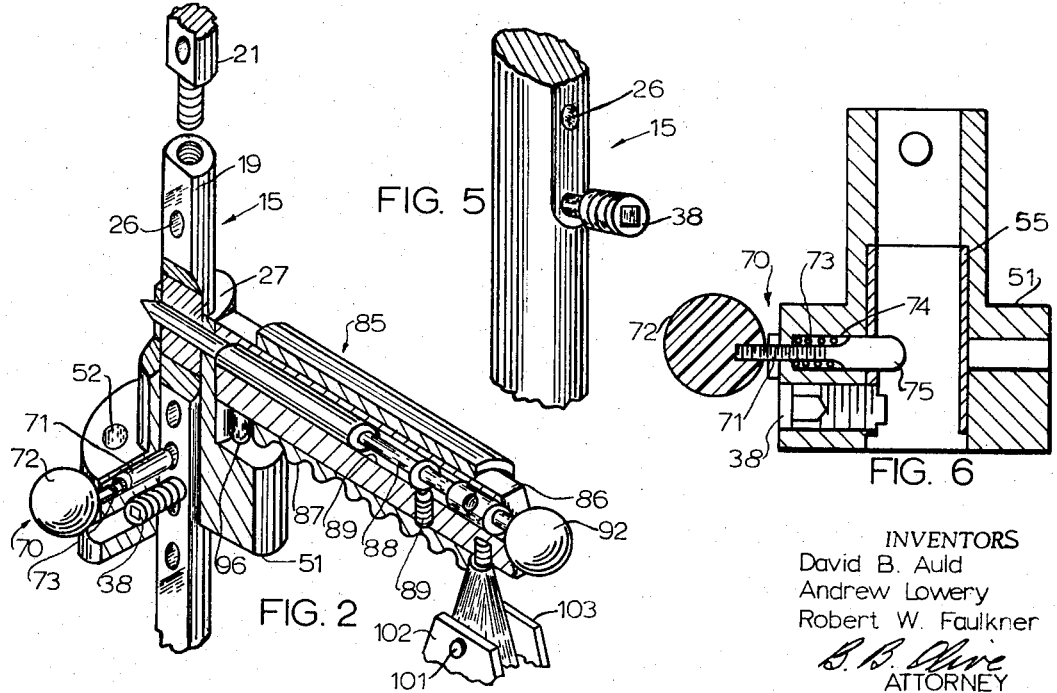
INVENTORS
David B. Auld
Andrew Lowery
Robert W. Faulkner
ATTORNEY

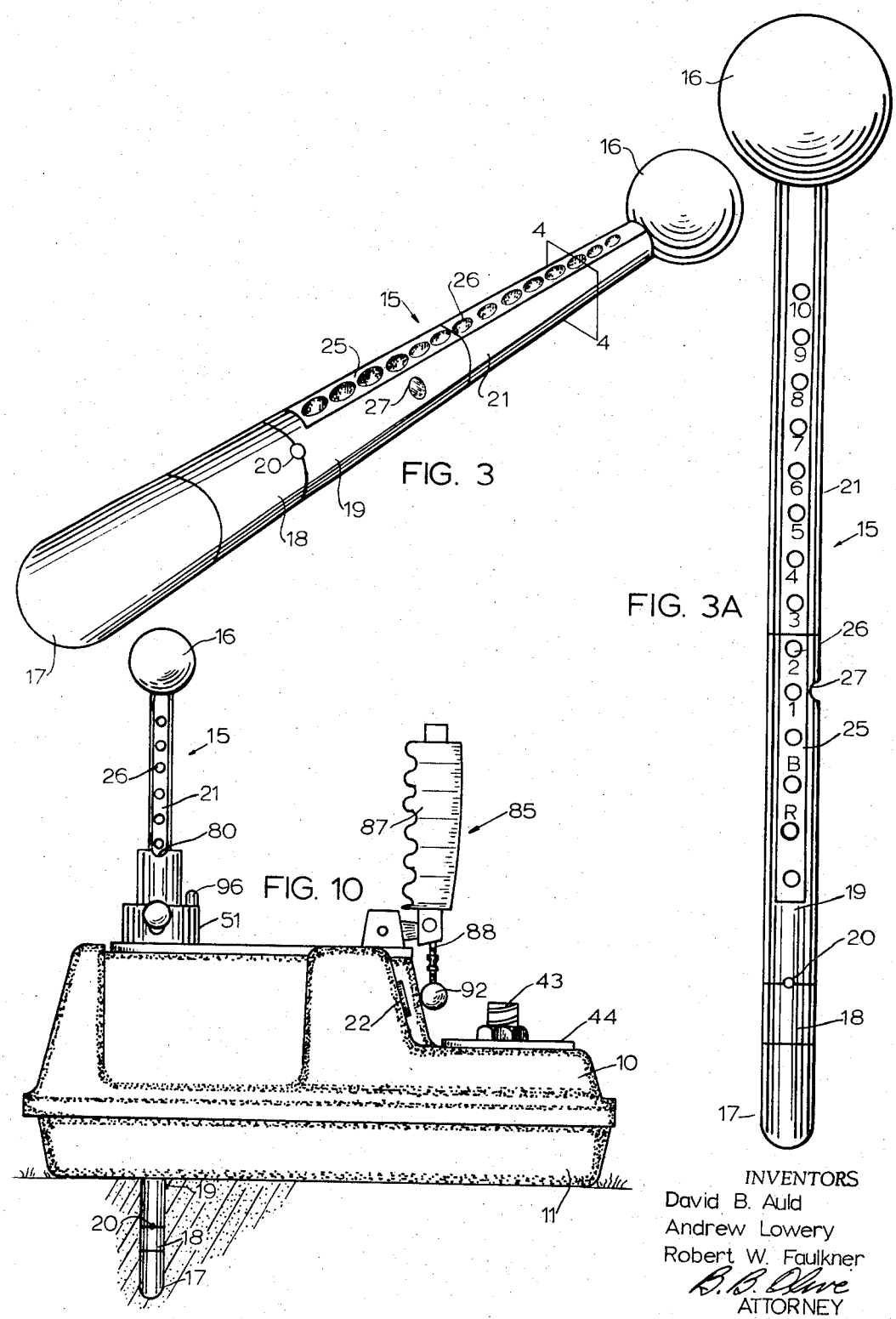

INVENTORS
David B. Auld
Andrew Lowery
Robert W. Faulkner
ATTORNEY

United States Patent Office 3,372,281
Patented Mar. 5, 1968

3,372,281
HANDLE-PROBE CONSTRUCTION FOR PORTABLE AND SUBSURFACE DENSITY GAUGE USING RADIOACTIVE SOURCE
David B. Auld, Raleigh, Robert W. Faulkner, Knightdale, and Andrew Lowery, Durham, N.C., assignors to Troxler Electronics Laboratories, Inc., Raleigh, N.C., a corporation of North Carolina
Filed Dec. 31, 1964, Ser. No. 422,796
3 Claims. (Cl. 250—106)

ABSTRACT OF THE DISCLOSURE

A cooperative probe and handle structure for a radioactive measuring gauge adapts the gauge source to surface back-scatter measuring positions, subsurface direct transmission measuring positions and shielded transport positions. The gauge handle is hollow and mounts a locking device which locks the probe and handle and makes the handle useful as a handle only when the probe is positioned so that the source is shielded. The gauge probe can be releasably locked in various positions such that the source can be placed in corresponding subsurface direct transmission positions or in a surface back-scatter position.

---

This invention is concerned with nuclear measuring instruments. More specifically the invention relates to a portable nuclear density gauge adapted to take both surface and subsurface measurements and is particularly concerned with the handle and probe structures employed in such a gauge.

Radioactive source material is employed in many of the recently developed portable measuring gauges for analyzing materials such as soils and concrete either by surface or subsurface methods. Such gauges are useful as a means for measuring density, moisture, material composition and the like. Safe use of the radioactive source is stressed however since portable radioactive units and loose safety practices inherently expose the operators to physical harm. For example, where a density gauge probe having a radioactive source is above ground and is unshielded considerable physical harm may result if the human body has a close and prolonged exposure to the radioactive source. It has become increasingly important therefore to design this kind of gauge so as to give maximum protection to the operator and minimum exposure to the source. It is also evident that the probe should be designed so that it cannot be jammed particularly in an unshielded state. Furthermore, experience shows the desirability of having a handle construction arranged so that the gauge can be lifted by the handle only when the radioactive source is in a safe shielded position.

Commercially available portable density gauges mount a radioactive measuring source in the end of a rod-like probe and this probe is mounted so that it can be lowered into a hole formed in the material and a subsurface measurement taken. Once the probe is retracted, it is contained within a lead block which shields the radioactive material on the sides. Shielding above and below the source is provided by the probe rod itself. Such a device is described in more detail in a copending United States patent application bearing Ser. No. 290,539, entitled "Safety Handle for Portable Surface Gauge Using Radioactive Source," filed June 25, 1963, and assigned to the assignee of the present invention, now abandoned and the subject of a copending continuation United States Patent application Ser. No. 560,396 entitled "Safety Handle and Probe for Portable Surface Gauge Using Radioactive Source," filed Jan. 20, 1966.

Certain commercially available portable nuclear gauges also employ the backscatter surface method to make the desired density and other measurements. This is accomplished by utilizing a probe which has a radioactive source that can be positioned on or near the surface of the material for measuring. Thus, the source must be on the very end of the probe so that the source will reside near or on the surface of the material when the probe is lowered to operating position. A movable shield must be provided to shield the bottom of the source when the probe is in the retracted position. It is also desirable that the source be required to be retracted and the movable shielding be required to be moved into shielding position before the instrument can be moved so as to protect the operator from possible harmful radiation. A portable surface type density gauge meeting these last-mentioned requirements is described in a further copending United States patent application bearing Ser. No. 320,899, entitled "Nuclear Measuring Instrument," filed Nov. 1, 1963, which is also assigned to the assignee of the present invention.

Both the backscattering surface method and the probe lowering subsurface method have proven satisfactory in field applications. However, occasions arise when both methods are needed which necessitates employment of the two different kinds of gauges. The ability to utilize both surface and subsurface techniques in a single gauge is thus much to be desired. Experience with the two kinds of gauges described in the referred to copending applications has indicated this need. Such experience has also indicated the need for further improvements in both the handle and probe structures employed. Aside from the need to accommodate to both techniques, experience with the type of safety handle and probe structure described in the referred to Ser. No. 290,539 application reveals that the probe collects an excessive amount of dirt, concrete dust and other debris depending on where used and this debris interferes with positioning of the safety handle and thus prevents efficient and safe operation of the gauge. A slight amount of dirt, for example, may prevent the required interlocking of the probe and handle in safe position as taught in the disclosure of the subject copending application. A more positive locking means for both the handle and probe in safe and operating positions is to be desired as well as means for preventing the unintentional complete withdrawal of the probe.

An object of the present invention is thus to provide an improved portable type, nuclear measuring gauge which lends itself to both surface and subsurface measurements.

Another object is to provide such a gauge with a movable probe having a radioactive source and means to positively lock the probe at a safe position and any of a plurality of operating positions corresponding to various depths in the material being measured.

Another object is to provide such a positive probe locking means which is essentially self-cleaning in operation.

Another object is to provide an improved handle structure for a portable type, nuclear measuring gauge employing a probe wherein the handle can be positively locked and used as a handle only when the probe is in a safe position.

A further object is to provide such a gauge employing a probe so designed as to prevent any accidental complete withdrawal of the probe source from the gauge.

The foregoing and other objects of the invention will appear from the following description and drawings in which like numerals refer to like elements in a preferred embodiment of the invention.

FIGURE 1 is a vertical sectional view of a portable type, nuclear density measuring gauge embodying the invention.

FIGURE 2 is a fragmentary perspective view, partially in section, showing the main internal structure of the handle and probe locking elements.

FIGURE 3 is a perspective view of a probe rod employed in the invention.

FIGURE 3A is an elevation view of the probe rod with typical index markings.

FIGURE 4 is a sectional view of the probe rod of FIGURE 3 taken along plane 4—4.

FIGURE 5 is a fragmentary perspective view of the probe rod and showing a pin guide and stop employed in the invention.

FIGURE 6 is a partial sectional elevation view of a collar assembly taken along line 6—6 of FIGURE 1.

FIGURE 7 is a side elevation view of the handle locking shaft of the invention.

FIGURE 10 is a side elevation view of the gauge with the probe lowered for measuring and the handle tilted.

Figure 9:
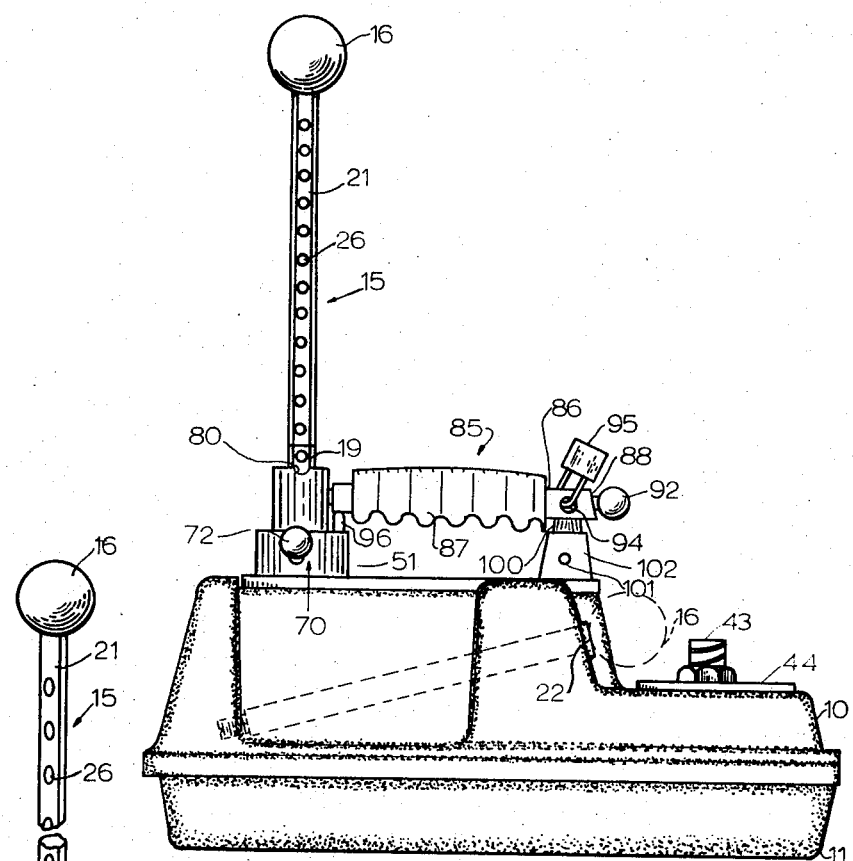
FIGURE 9 is a side elevation view of the gauge in locked safe carrying position and in dotted lines the position of the upper portion of the probe when stored for carrying.
Figure 8:
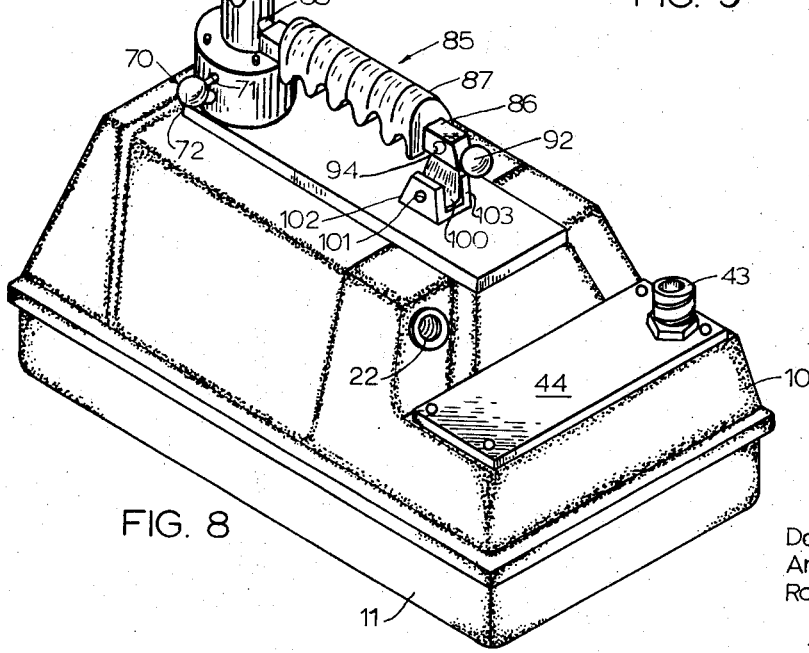
FIGURE 8 is a perspective view of the gauge shown in FIGURE 1.

Referring now to the drawings, a nuclear measuring device of the type being described is frequently used as a soil density measuring gauge. The illustrated gauge includes a housing having an upper section 10 suitably secured to a lower section 11. Various commercially available plastics are suitable for forming the housing particularly since the housing is essentially a non-load bearing member. The probe, generally designated 15, is formed as a circular rod-like member. Probe 15 comprises a spherical shaped grip 16, hard rubber being suitable, a removable shielding tip 17, a source generally indicated at 18 (Cesium 137 and Radium 226 being typical), a lower index section 19 which is pinned by pin 20 to source 18 and an upper index section 21. As illustrated particularly in FIGURES 2 and 9, the upper index section 21 may be unscrewed from the lower index section 19 and stored in the storage tube 22 as indicated in FIGURE 9. While not shown in detail, it will be understood that storage tube 22 comprises a receptacle residing in the housing and suited to receiving the upper index section 19 when the gauge is being carried. Foam plastic may be used to fill the housing.

To complete the description of probe 15, it will be noted that a major portion of the probe carries a milled out flat face 25 suitable for carrying index marks such as the numbers 1 through 10 and the letters B and R shown in FIGURE 3A, the letter B being used for a backscatter position and the letter R being used for a reference calibration position. Face 25 carries a series of indexing holes 26 corresponding to the aforesaid index numbers and letters and which are later discussed. Perpendicularly aligned to the axis of the holes 26 is a further hole 27 in probe 15 and whose purpose as later seen is to provide means for positively locking probe 15 in a safe position. Rotation of probe 15 and accidental complete withdrawal of the probe from the housing is prevented by means of a set screw 38 (FIGURES 2, 5, 6) later referred to and which also serves to keep face 25 in alignment with the indexing mechanism later discussed.

Shielding for the probe source 18 is provided by a hollow, open-ended cylindrical lead member 30 and an aluminum, or other suitable material, collar shaped spacer member 31 which resides on member 30 and is secured thereto by means of suitable screws 32 or the like. Member 30 is further secured to the bottom wall of lower housing section 11 by means of screws 33. Additional protection against direct and reflected rays emitted by source 18 particularly when in an extended subsurface operating position as in FIGURE 10 is provided by a substantially rectangular shaped lead block 34 which is also secured to the bottom wall of section 11. Appropriate photo-multiplier or Geiger-Mueller counting tubes, generally indicated at 40, are mounted as shown and are given further protection from spurious responses by the protective block shielding member 41 and overhanging shielding member 42. A suitable connector 43 mounted on a plate member 44 enables appropriate electrical connections to be made to tubes 40. A reference aperture 45 allows a reference count when probe 15 is in a retracted position.

Shielding members 30 and 31 mount a guide tube 49 which receives in a slidable relation the probe 15. A collar 51 is secured by means of bolts 52 which pass through collar 51, through a supporting plate 53 located on top of upper housing section 10, through the top wall of upper section 10 and into shielding member 31 where the bolts 52 are threadably secured. A probe guide bushing 55 (FIGURE 6) is mounted in collar 51 and is preferably formed of nylon or the lie. Probe 15 is further guided by means of an additional collar shaped guide bushing 60 (FIGURE 1) which is inset into the base of shield member 30 and secured thereto by suitable glue, screws or the like, not shown. Like bushing 55, bushing 60 is preferably made of nylon or the like to give durability and avoid the need for lubrication. Of particular value to the present invention is the fact that bushing 60 is formed to fit probe 15 in a substantially snug relation so as to act as a means for wiping probe 15 free of any mud, dust or other debris that lodges on the probe during use.

Vertical positioning of probe 15 is effected by means of a spring loaded detent assembly 70 comprising a detent rod 71, a spherical grip 72, preferably formed of hard rubber or the like, and a coil compression spring 73 which is mounted on rod 71 and resides in the cavity 74 formed in collar 51. The end portion 75 of detent rod 71 is formed in a somewhat hemispherical shape as best shown in FIGURE 6 and is adapted to engage the previously mentioned probe indexing holes 26. That is, in operation the operator by means of grip 72 pulls rod 71 outwardly against the pressure of spring 73 so as to bring the end portion 75 free of the milled face 25 such that probe can be moved freely up or down to the desired position. When the desired position is obtained the end portion 75 is allowed to enter the appropriate indexing hole 26 and when fully entered provides a positive locking means for probe 15 in such operating position. A small semi-circular groove 80 is formed in the upper surface of collar 52 to assist in positioning the index numbers and letters shown in FIGURE 3A. When a particular number or letter is brought within groove 80 the operator knows that a particular hole 26 is aligned with detent rod 71 such that probe 15 can be positively locked at the corresponding depth position in the material being measured. Holes 26 and the index numbers and letters illustrated by FIGURE 3A may of course vary in position. For example, in one type of gauge employing the invention it has been found useful to provide indexing positions at one inch intervals.

A major factor in using a gauge of the type being described concerns the matter of source shielding when the gauge is inoperative and is being transported. To insure that the source is in a shielded position when the gauge is being carried, the handle assembly, designated 85, is arranged such that the handle member 86 and surrounding grip 87 can only be employed as a handle when probe 15 is positively locked in a safe position. For this purpose, a slidable handle locking rod 88 is mounted within a suitable bore 83 provided in handle member 86 and is arranged to engage the hole 27 in probe 15 when such hole is aligned opposite rod 88. A spring loaded ball plunger assembly generally represented at 89 engages rod 88 and by means of a hump portion 90 (FIGURE 7) indicates to the operator when the rod is fully engaged. The ball plunger assembly 89 also acts to engage a lip 91 (FIGURE 7) on rod 88 to prevent rod 88 from being completely withdrawn from handle member 86. A spherical grip 92 assists in moving rod 88 in and out and immediately in front of grip 92 there is provided a hole 93 in rod 88 which mates with a corresponding hole 94 in handle member 86 to receive a padlock 95 as indicated in FIGURE 9. That is, when the handle is secure and in safe position with probe 15 also being in safe position, the handle assembly 85 may be locked in such position. A pin 96 assists in bringing the handle assembly into alignment.

Continuing the description of the handle assembly 85, it will be noted that member 86 is pivoted by means of a stud member 100 threadably secured to member 86. Member 100 in turn pivots on a pin 101 which is mounted in a U-shaped frame comprising a pair of support members 102, 103. Members 102 and 103 are in turn secured by screws 105 which pass through the supporting plate 53, through the top wall of upper housing section 10 and into a backing plate 106 (FIGURE 1). As best shown in FIGURE 10 the entire handle assembly 85 is thus enabled to tilt rearwardly when not in use.

When used for subsurface measurements, handle rod 88 is disengaged from hole 27 in probe rod 15 and the handle assembly is tilted to the inoperative position of FIGURE 10. Detent rod 71 is then re-engaged in the corresponding hole 26. After the readings have been taken the probe rod 15 is then repositioned in a reverse manner. It will be noted that in the event a piece of mud, dirt or other debris has collected in hole 27 it will be pushed out by entry of handle rod 88. Thus, experience with a gauge following the present invention has shown that by placing a handle locking rod within the body of the handle and allowing the end of the handle rod to pass completely through a mating hole in the probe when in safe position, a positive, quick and virtually foolproof safety system is provided. It has been particularly evident that the construction employed in probe rod 15 is superior to the probe rod structure previously disclosed in copending application Ser. No. 290,539 in that it tends to collect far less debris in use and in cooperation with the wiping bushing 60 normally presents relatively clean operating surfaces even though used extensively in the field. Handle rod 88 is also given some measure of protection from abuse in the field by being enclosed in the handle assembly 85. The operator is also assured of knowing that the gauge can be padlocked as in FIGURE 9 only when the source is in an absolutely safe position. It will also be noted that the handle assembly when used rests on upper surfaces of the collar 51 and that rod 88 passes completely through the upper portion of collar structure 51 so that all weight is supported by the handle assembly.

For use in surface or backscattering measurements, probe rod 15 must be lowered sufficiently to allow the shielding tip 17 to project below the lower housing section 11. Probe rod 15 is then locked in this position by means of detent rod 71 and shielding tip 17 is removed by the operator preferably with brief exposure of only his hand. With shielding tip 17 removed, the gauge is placed directly on the material to be measured and with the source 18 resting near the material and probe 15 locked in the "B" position or backscatter position shown in FIGURE 3A, the desired measurements are taken after which the tip 17 is reinstalled. The probe rod 15 is then locked back in safe position as before which procedure can of course be accomplished rapidly with the probe and handle construction of the present invention.

In summary, the invention provides a portable nuclear type measuring gauge which is adapted to both surface and subsurface measuring. The handle and probe structures employed are essentially foolproof in operation and tend to collect a minimum of debris which would otherwise interfere with or prevent rapid and safe operation. Positive locking in a safe carrying position is assured whenever the handle is being employed to transport the gauge. Since the invention is primarily concerned with the handle and probe constructions and not with the counters or counting circuits or the source, per se, such subject matter has been dealt with throughout the description only in a general manner.

While one specific embodiment of the invention has been illustrated and described in some detail, it will be apparent that the invention is susceptible to numerous modifications within the spirit and scope of the invention as now set forth in the claims.

What is claimed and desired to be secured by Letters Patent is:

1. In a portable nuclear measuring gauge designed for both subsurface direct transmission measuring and surface back-scatter measuring, a vertically disposed elongated cylindrical probe comprising a major cylindrical body element, a cylindrical element containing a radioactive source and secured to the bottom of said body element, and a cylindrical shielding element removably secured to the bottom of said source element and effective to shield downward radiation therefrom, said body element having a flat face formed over a major portion thereof in a plane parallel to the longitudinal axis thereof and containing a series of longitudinally aligned vertically spaced horizontally positioned indexing holes formed therein at least one of said indexing holes corresponding to a surface back-scatter position of said source and the remainder of said indexing holes corresponding to subsurface direct transmission positions, said body element having a further horizontally positioned locking hole corresponding to a surface shielded position of said source; a housing including top and bottom walls; radioactive shielding block means secured within said housing to said bottom wall and having a vertically oriented cylindrical opening therethrough arranged for passage of said probe; a handle assembly extending lengthwise of said gauge and having one end remote from said probe pivotally secured to said top wall and an opposite free end swingable adjacent said probe when in a substantially horizontal carrying position, said assembly including a hollow handle grip member, a slidable locking rod mounted to travel within said grip member and when horizontal to be aligned with and pass through said locking hole thereby to positively secure said source in said safe shielded position within said block means thereby to make said assembly usable as a handle only when said source is so positioned; a collar structure secured to said shielding block and including a hole therethrough alignable with said locking hole and an upper surface engageable with said handle assembly free end when said rod is in said locking hole, the weight of said block thereby being transferred to said handle assembly when said gauge is moved; and a second slidable locking rod mounted in said collar structure and arranged for operation along an axis perpendicular to the said plane of said probe face to selectively engage said indexing holes whereby to enable said source to be positively held at predetermined said surface and subsurface measuring positions.

2. In a portable nuclear measuring gauge according to claim 1 including pin means mounted in said collar structure and having one end engageable with said flat face whereby to prevent rotation and accidental removal of said probe from the top of said gauge.

3. In a portable nuclear measuring gauge as claimed in claim 1 wherein said body element is removably secured to said cylindrical source element and said housing provides a storage chamber for storing said body element when removed from said source element.

References Cited

UNITED STATES PATENTS 3,010,022   11/1961   Boekamp  ---------- 250—106
3,126,484   3/1964   Meeder et al.  -------- 250—106

FOREIGN PATENTS 125,695   5/1959   Russia.

ARCHIE R. BORCHELT, *Primary Examiner.*